INVENTOR
Jack J. Burch
BY René E. Grossman
ATTORNEY

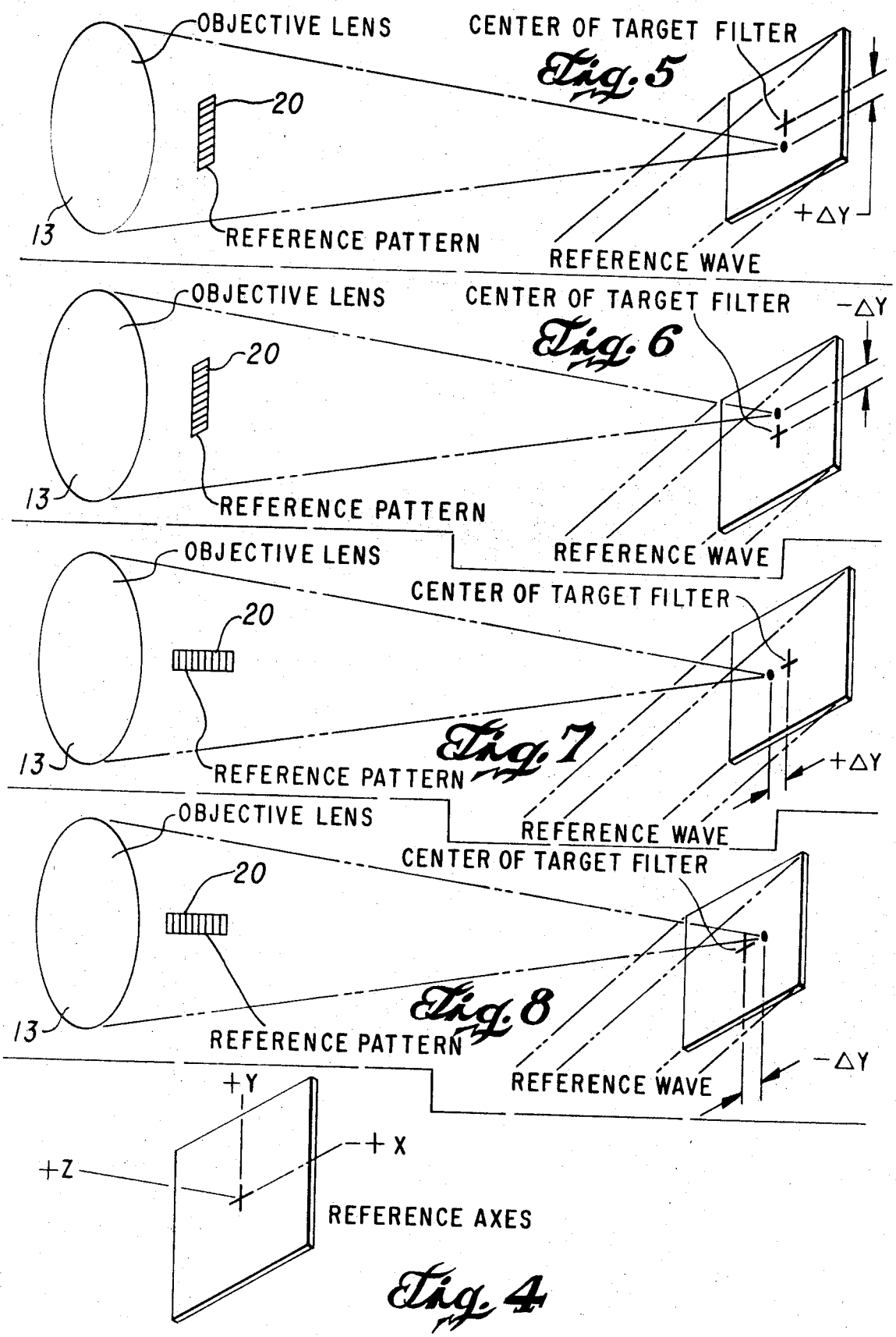

United States Patent Office 3,539,260
Patented Nov. 10, 1970

3,539,260
METHOD AND APPARATUS FOR AUTOMATIC ALIGNMENT OF COHERENT OPTICAL SPATIAL FREQUENCY FILTERS
Jack J. Burch, Dallas, Tex., assignor to Texas Instruments Incorporated, Dallas, Tex., a corporation of Delaware
Filed Oct. 2, 1967, Ser. No. 672,340
Int. Cl. G06k 9/04; G01b 11/26
U.S. Cl. 356—71                    9 Claims

ABSTRACT OF THE DISCLOSURE

A method and apparatus are disclosed for automatically aligning spatial frequency filters used in coherent optical processing. The spatial frequency filter is constructed by an interferometric technique, such as a Fraunhofer hologram. After the filter is constructed to perform the desired information processing operation, positional reference patterns are superimposed upon the filter. Displacement of the resulting filter from an optimum position causes displacement signals due to the position references. The signals are detected by light sensors, and the signals therefrom are subtracted in a differential amplifier to form an error signal. The error signal is used to drive electromechanical servo units to correct the filter position.

---

This invention relates to information processing, and more particularly to an improved method and apparatus for automatically aligning spatial frequency filters in optical processing.

Coherent optics is a natural approach to processing two-dimensional pictorial data as millions of bits of information can be processed in parallel, and complex operations, such as spectral analysis by Fourier transformation, and pattern correlation can be accomplished with a simple configuration of lenses. However, coherent optical processing has not been susceptible in the past to high speed, automatic processing of data because of the large numbers of different filters required and the alignment problems associated therewith.

Accordingly, it is an object of this invention to provide a method and apparatus for automatic filter alignment of each such filter with the necessary high precision.

This and other objects and features of the invention will become apparent from the following detailed description when read in conjunction with the appended claims and accompanying drawings.

FIG. 4 illustrates the reference axes used for the target filter illustrated in FIGS. 5–8;

FIGS. 5, 6, 7 and 8 illustrate a method of making a special filter for automatic alignment, according to the invention;

In essence, the invention comprises a method and apparatus for automatically aligning coherent optical filters by superimposing upon the filter of the target of interest a set of positional reference patterns, the misalignment of such patterns producing an error signal which causes servo means to drive the filter to the correct alignment position.

Figure 1:
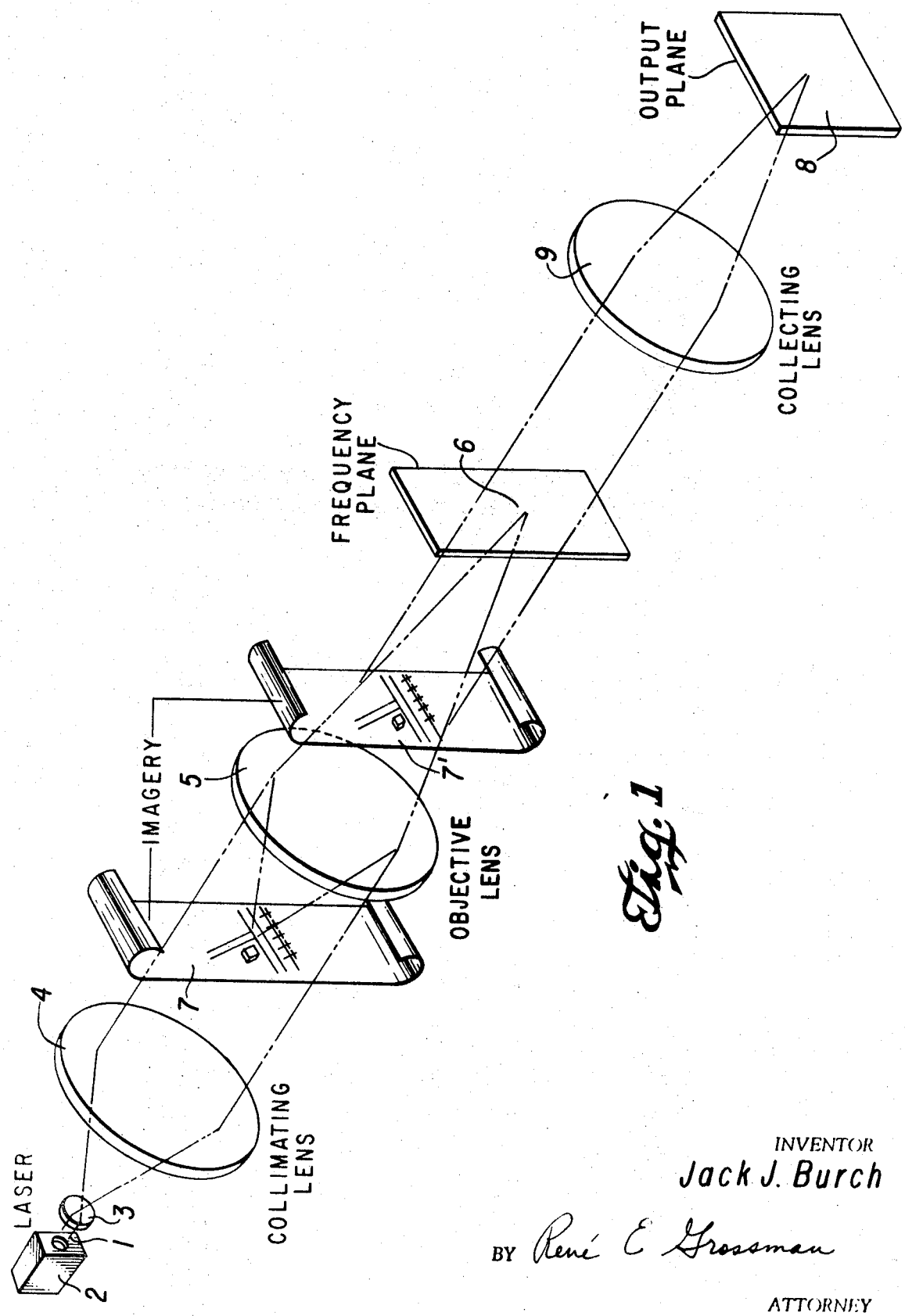
FIG. 1 is a perspective view of a coherent optical data processing system.

Typical operation of a coherent optical processing system is illustrated in FIG. 1. A beam 1 of coherent light from a suitable source such as laser 2 for example is brought to a focus point by a microscope objective lens 3 having a very short focal length. The light then diverges beyond said focal point unitl it reaches a beam width large enough to encompass a frame of imagery 7 for a purpose to be subsequently described. When the diverging beam has reached such a width, a collimating lens 4 is introduced to make the beam of light parallel. An objective lens 5 is inserted in the path of the collimated coherent light. The frame of imagery 7 (which can be an aerial photo reconnaissance transparency, for example) may be introduced into the beam of coherent light for processing, either to the left of the objective lens 5, or to the right of the objective lens as at 7′. A limitation on placement of the imagery 7′ to the right of the objective lens is that the frame of imagery cannot be placed further to the right than that point at which the converging beam width equals the frame size of the imagery on the frame. In either of these positions the diffraction pattern produced by the coherent light passing through the imagery on the frame will be produced in the front focal plane of the objective lens 5, which plane is orthogonal to the optical axis of said lens and which is located at the spatial filter 6. The objective lens 5 is a spherical lens and therefore the diffraction pattern produced in the front focal plane is a good approximation of the two-dimensional frequency spectrum or Fourier transform, of the image on frame 7. This transform relation is described more fully by A. Vander Lugt, "Operational Notation for the Analysis and Synthesis of Optical Data-Processing Systems," proceedings of the IEEE, volume 54, No. 8, August 1966, pages 1055–1063.

If the spectrum resulting from the previously described diffraction pattern or Fourier transform of the image were unaltered, the original image would re-form in a plane perpendicular to the axis of the objective lens. However, linear filtering operations can be accomplished by appropriately altering the frequency spectrum produced at the front focal plane 6 of the lens 5. This plane is, for convenience, known as the frequency plane because of the frequency spectrum of the spatial information contained in the imagery which appears in that plane. Such filtering operations can be performed by attenuating portions of the light in the frequency plane with masks produced on photographic material. The optical trasmission pattern of these masks determines the nature of the filtering operation.

Figure 2:
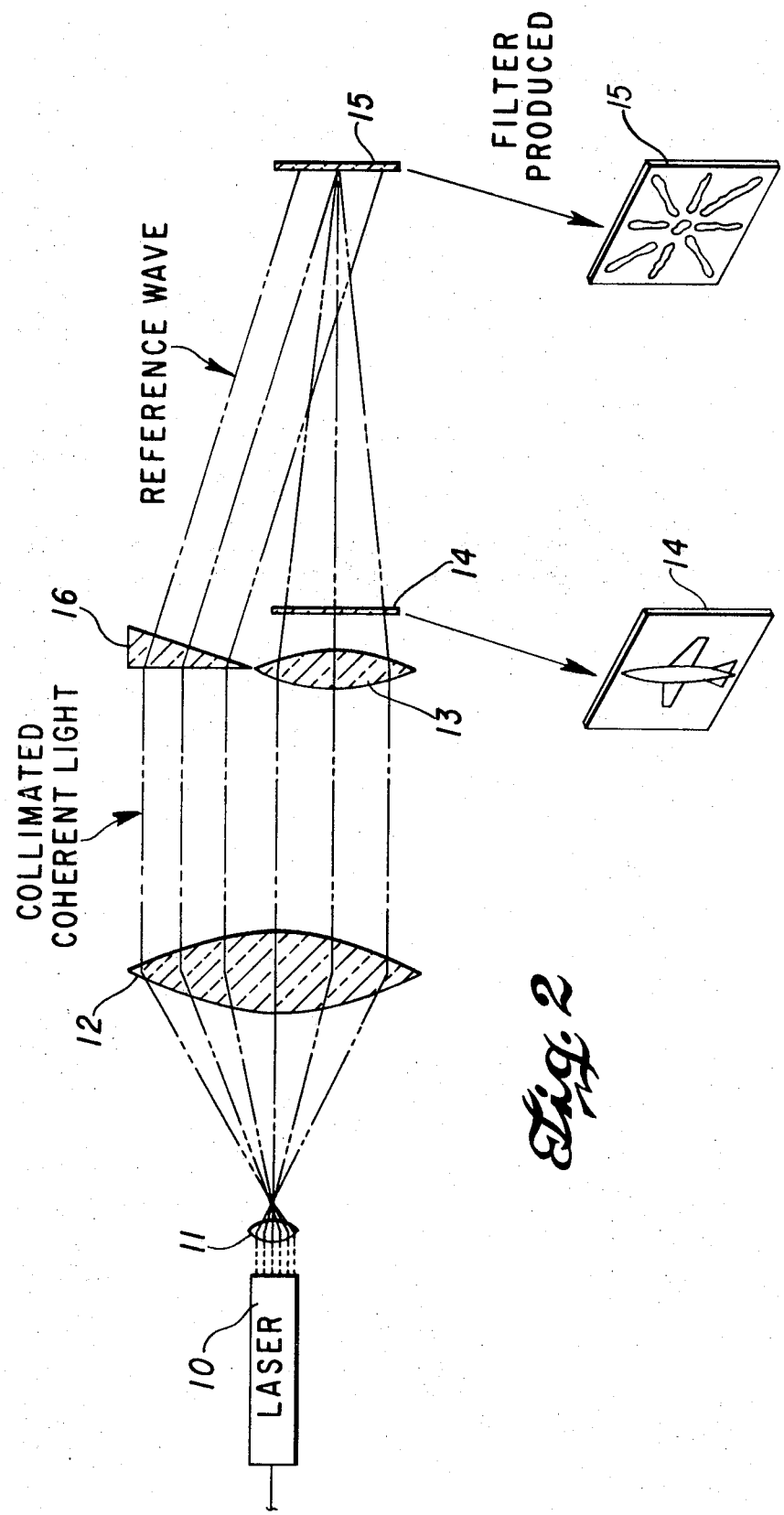
FIG. 2 illustrates an interferometric filter synthesizer for synthesizing a filter for use in the processing system of FIG. 1.

Filters for the automatic detection of particular targets on imagery (so-called match filters), such as an airplane, for example, on the frame of imagery 7 in FIG. 1, are made by using an interferometric filter synthesizer. Such a device is illustrated in FIG. 2. Therein is shown a collimated beam of coherent light produced by the laser source 10 and, as previously described in connection with FIG. 1, the laser beam is focused to a point by microscope objective lens 11. The coherent light then diverges from that point until a sufficient beam width is achieved for purposes to be subsequently described. At said beam width collimating lens 12 is inserted in the beam to make the coherent light once again parallel. A portion of said beam of collimated light is passed through objective lens 13 and image 14 of the target of interest is inserted into the beam of converging light to the light of the objective lens 13. The two-dimensional frequency spectrum, or Fourier transform of the target, is formed in the front focal plane of spherical objective lens 13, just as was described in connection with the frame of imagery 7 in FIG. 1. A photographic medium 15 upon which the filter is to be made is inserted at this focal plane of lens 13.

The frequency spectrum produced at the focal plane of the lens 13 is a complex function; that is, it has both amplitude and phase terms. If an ordinary photograph of this frequency spectrum were taken, as would be the case if the photographic medium 15 were exposed to the light from the lens 13 only, phase information would be destroyed and only the light intensity pattern would be recorded. This recording characteristic is due to the fact that a photographic film acts as a square-law detector, recording light intensity only.

Synthesizing the proper filter for target detection requires recording of both the phase portion of the frequency spectrum and the amplitude distribution. This is accomplished by diverting another portion of the collimated beam from lens 12 through prism 16 to impinge upon photographic medium 15 at an angle. This secondary wave is known as the reference wave. Since coherent light is additive in amplitude, the reference wave is added to the diffraction pattern of the target being recorded by photographic medium 15. The reference wave may be described as a two-dimensional, complex, sinusoidal wave, which, after the photographic square-law detection, acts as a carrier wave for the frequency spectrum of the target. The exposed material, after being photographically developed, is a Fraunhofer hologram of the target on photographic medium 14 and is used as a spatial frequency filter. This process of interferometric filter synthesizing, along with the processing system previously described using a filter made by such a process, is more fully described by A. Vander Lugt, "Signal Detection by Complex Spatial Filtering," IEEE Transaction on Information Theory, April 1964, pages 139–145.

These two-dimensional frequency filters have the property of concentrating target energy into an impulse of light in the output plane 8 of FIG. 1. The collecting lens 9 thereshown focuses the light transmitted through frequency filter 6 located in the frequency plane of lens 5 onto the output plane 8 which is located at the focal plane of the lens 9.

A threshold level is established by statistical considerations of target and the background characteristics. When a light impulse transmitted through the filter exceeds this threshold value, a target is assumed to be present. The type of target corresponds to the particular filter causing the light impulse. The output plane has a 1-to-1 spatial correspondence with the imagery on frame 7 being processed. Therefore the location of the light impulse in the output plane indicates the target position. A readout of the output plane, by a light sensing means such as an image camera tube or a matrix of light detectors, converts light energy into electronic signals for display, storage, transmission, or further processing. In using the processing system, imagery 7 is introduced into the beam of coherent light frame by frame and a number of filters are mechanically switched into the processing system for each frame of imagery. For example, a frame of imagery is placed in the position indicated as 7 or 7' in FIG. 1. Filters 6 will have been prepared in advance as above described for each of one or more of the specific targets on the frame. While the frame is held in a stationary position, the filters 6, prepared for each of the targets, are passed in front of the frame. Since each target occupies a definite position or location on the frame, coherent light transmitted through the optical filter 6 of a particular target will cause a spot of light on the output plane 8 to be positioned in the same relative location thereon as the location of the target in the frame 7 or 7'. This practice allows a search for different types of targets on the frames and for targets having many possible aspects and features.

Figure 3:
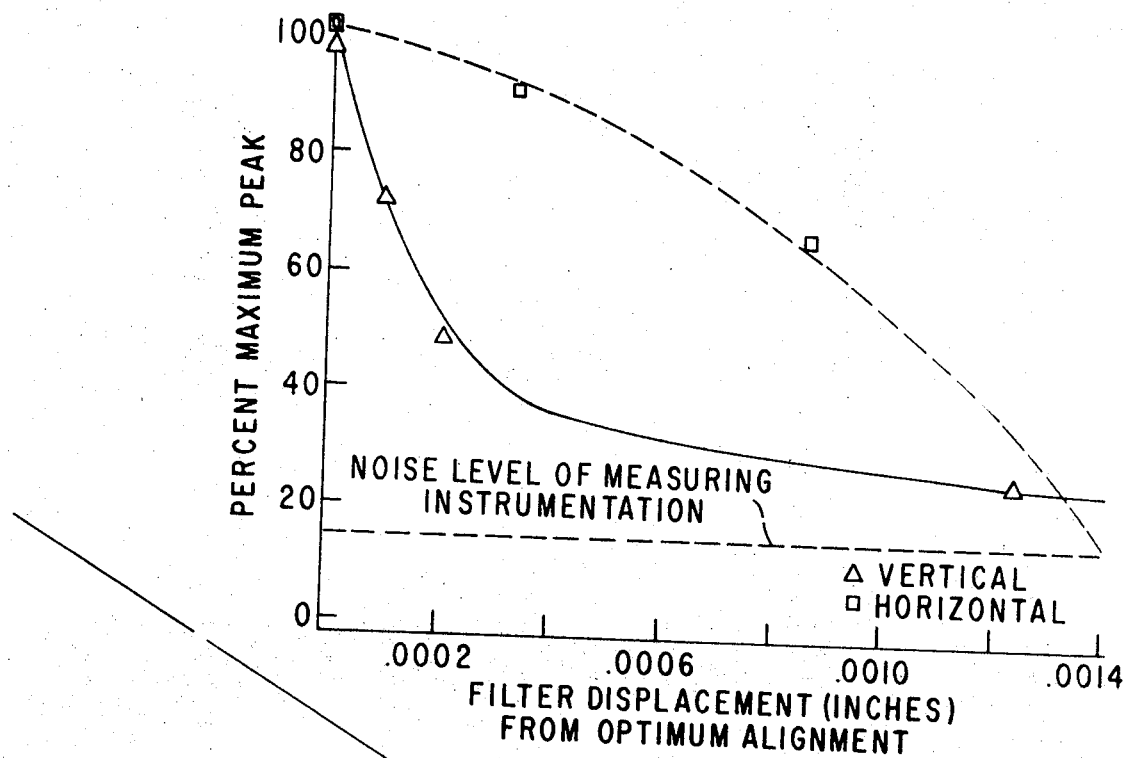
FIG. 3 is a graph illustrating decreasing information obtained from the processing system of FIG. 1 due to filter misalignment.

The minimum number of filters used depends upon the number of filters needed to detect the targets of interest. In this context, it should be noted that filter positioning is a very critical task. Calculations and measurements indicate that in some applications the required accuracy for positioning filters is only a few tenths of a mil. Empirical data demonstrates the falloff of light output at the output plane as a function of filter misalignment. FIG. 3 illustrates a graph of the percent of maximum light output as a function of filter displacement. The graph shows curves for a filter which was displaced both in the vertical and horizontal direction.

To overcome the problems of filter misalignment, a novel automatic servo control filter positioning system is used and is herein described for rapidly achieving filter alignment in an operational system. This technique uses the critical effect of misalignment to sense the correct filter position, and to produce an error signal when the filter is not in the correct position, which in turn causes the filter to be driven to its correct position. The automatic alignment technique uses a special type of filter, having not only target information but also reference information superimposed thereon. The filter is constructed or synthesized, as follows:

Initially, the photographic medium, or film, which is to be used to form the filter is exposed to the target information as described in connection with FIG. 2 using the interferometric filter synthesizer thereshown. After exposure to the target information and before removing the film from the synthesizer, it is exposed four additional times in a manner to be subsequently described, using as an image, a special reference pattern. This reference pattern is chosen to have the special characteristic of producing a very good light impulse in the output frame of FIG. 1 when used with a matched filter applied to such a pattern; that is, if the reference pattern were inserted in the same plane as the position of the imagery of FIG. 1 and a match filter for that reference pattern were inserted in the frequency plane of lens 5 of FIG. 1, a strong light impulse would be produced in the output plane.

FIG. 4 illustrates the reference axes used for the target filters illustrated in FIGS. 5–8.

FIGS. 5, 6, 7 and 8 illustrate the method used for synthesization of a match filter for such a special reference pattern (in conjunction with a match filter for the target of interest). These figures illustrate the technique used for making the second, third, fourth, and fifth exposures of the film 15 in FIG. 2, the first exposure being that of the target image. In each of these figures, which illustrate the interferometric filter synthesizer of FIG. 2, only the converging beam from objective lens 13 which passes through target image 14 is shown in full, the reference beam from prism 16 being shown only partially at its intersection with film 15. The target image 14 which is shown in FIG. 2 has been removed in FIGS. 5, 6, 7 and 8, film 15 having been previously exposed to this image.

Referring initially to FIG. 5, reference pattern 20, previously discussed, is placed in the beam of converging coherent light to the right of the objective lens 13, in a similar position to that of the target image now removed of FIG. 2. Before making the exposure for this reference pattern, film 15 is shifted along the Y axis, a distance of $+\Delta Y$. This causes the focal point of the beam from objective lens 13 for the reference pattern 20 to be displaced a distance $\Delta Y$ below the focal point of the beam for the target image 14. The manner of determining this distance $\Delta Y$ will be disclosed at a subsequent point in this description. The third exposure of the film 15, as indicated in FIG. 6, is made very similarly to the second exposure. The only condition changed in making this third exposure from that used in making the second exposure is the displacement of the film. Here the film is displaced along the Y axis, a distance of $-\Delta Y$ from the position of the film when it was exposed to the target image 14.

Consequently, the focal point of the converging beam from the lens 13 for the reference pattern 20 is displaced a distance ΔY above the focal point of the beam for the target image.

The second and third exposures of film 15, just described, are made to compensate for filter misalignment in the Y direction. In order to compensate also for misalignment in the X direction, the fourth and fifth exposures, as shown in FIGS. 7 and 8 are made. Although the exposures shown in FIGS. 7 and 8 use the same references pattern as used for the exposures of FIGS. 5 and 6 it is to be noted that the reference pattern used in FIGS. 7 and 8 is rotated 90° within the converging beam from the position used for the exposures of FIGS. 5 and 6. This is done because the match filters made from the reference image are especially sensitive to movement in one direction, and the reference pattern is aligned within the converging beam so that the match filter made therefrom has its sensitive axis coincidental with the axis of interest for the overall filter (i.e., the sensitive axis aligned with the Y axis in FIGS. 5 and 6, and the X axis in FIGS. 7 and 8). The method illustrated in FIGS. 7 and 8 differs further from that illustrated in FIGS. 5 and 6 in that the film is shifted to the right or to the left, along the X axis by a distance ΔX from the position of the film when making the exposure for the target image. The distance, ΔX, is, as with ΔY, above to be further defined at a subsequent point in this description.

After exposure to the five images of interest, film 15 is then developed. The developed film then comprises five superimposed match filters, a match filter for the target of interest, and four match filters for the reference pattern along each of the four sensitive axes (i.e., −X, X, −Y, Y).

The distances ΔX and ΔY are determined empirically as follows: because the holding fixture for the filter in the processing system of FIG. 1 cannot be made to the exact dimensions of the filter (and still be able to slide the filter in and out) there will be some "slop" or mechanical tolerance in the fixture. This will allow some movement of the filter within the fixture, which can cause misalignment of the filter. Reference to FIG. 3 will indicate how extremely small movements of the filter can cause severe fall-off in response of the filter. This "slop" is considered to be equally distributed on either side of the filter, from the optimum alignment position, along the X and Y axes. Accordingly, the distances ΔX and ΔY, which represent the distances from the point of optimum match for the target filter to the point of optimum match for the reference element filter along one axis, are made equal to one-half of the "slop" along the pertinent axis. The reason for this will become more apparent in connection with the description of FIG. 9 hereinafter.

Figure 10:
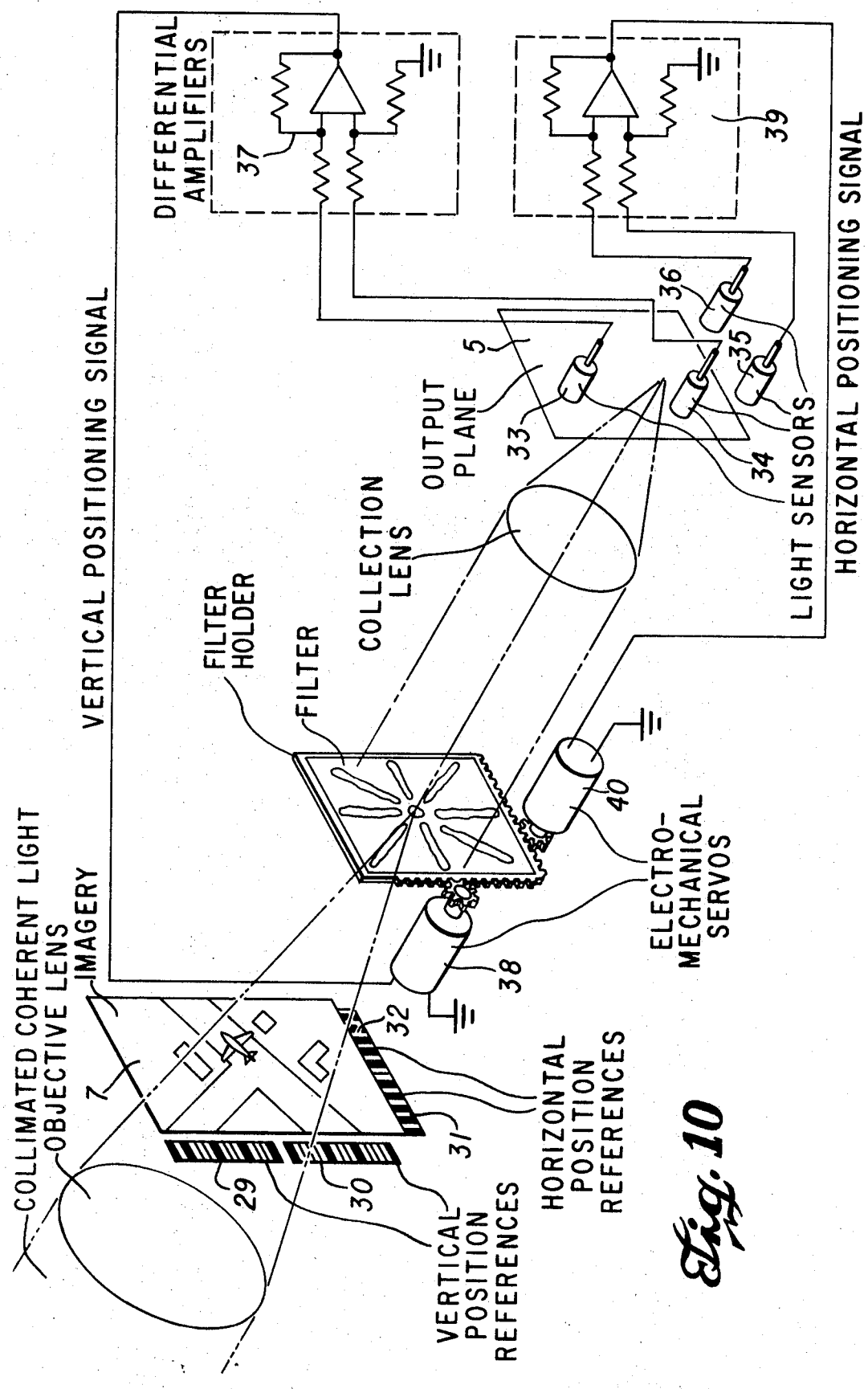
FIG. 10 illustrates a processing system using the special filter for automatically aligning such a filter.

Having synthesized this special filter, it is inserted into the processing system of FIG. 1 in lieu of the filter thereshown, (at the front focal plane of the lens 5) and that processing system, along with certain modifications to be subsequently described, operates to automatically align each filter placed in the system. Such a modified system is illustrated in FIG. 10. In this figure, the imagery 7 is placed within the beam of light, just as in FIG. 1, but, in addition, in this modified processing system, reference patterns 29 and 30, which are identical to those used for making the special filter (shown in FIGS. 5 and 6), are placed along one side of the imagery and a like set 31 and 32 is placed along the orthogonal side, e.g., on the frame holders (not shown) for the film. These constitute the vertical position reference and the horizontal position reference, respectively. The special filter then, having the reference images superimposed thereon, is matched to a particular target or pattern which is sought to be discovered in the original imagery. If the filter is centered on the optical axis, it is perfectly aligned for the pattern of interest, but if it is shifted away from the optical axis in any direction by an amount ΔY and ΔX, it becomes a matched filter for one of the reference patterns 29, 30, 31 or 32. If the filter is offset either up or down, it will become matched to one of the reference elements 29 or 30 and a bright spot of light will appear at the edge of the output plane at the same corresponding location as the elements 29 and 30. This bright spot of light will be detected by light sensors 33 and 34 placed behind the output plane and along the edge in question. Similarly, a displacement of the filter to the left or right will cause the filter to become matched to the reference elements 31 or 32, thus producing a bright spot in the output plane along an edge corresponding to the location of the elements 31 and 32 relative to the imagery. This bright spot will be detected by light sensors 35 and 36 located behind the output plane.

Figure 9:
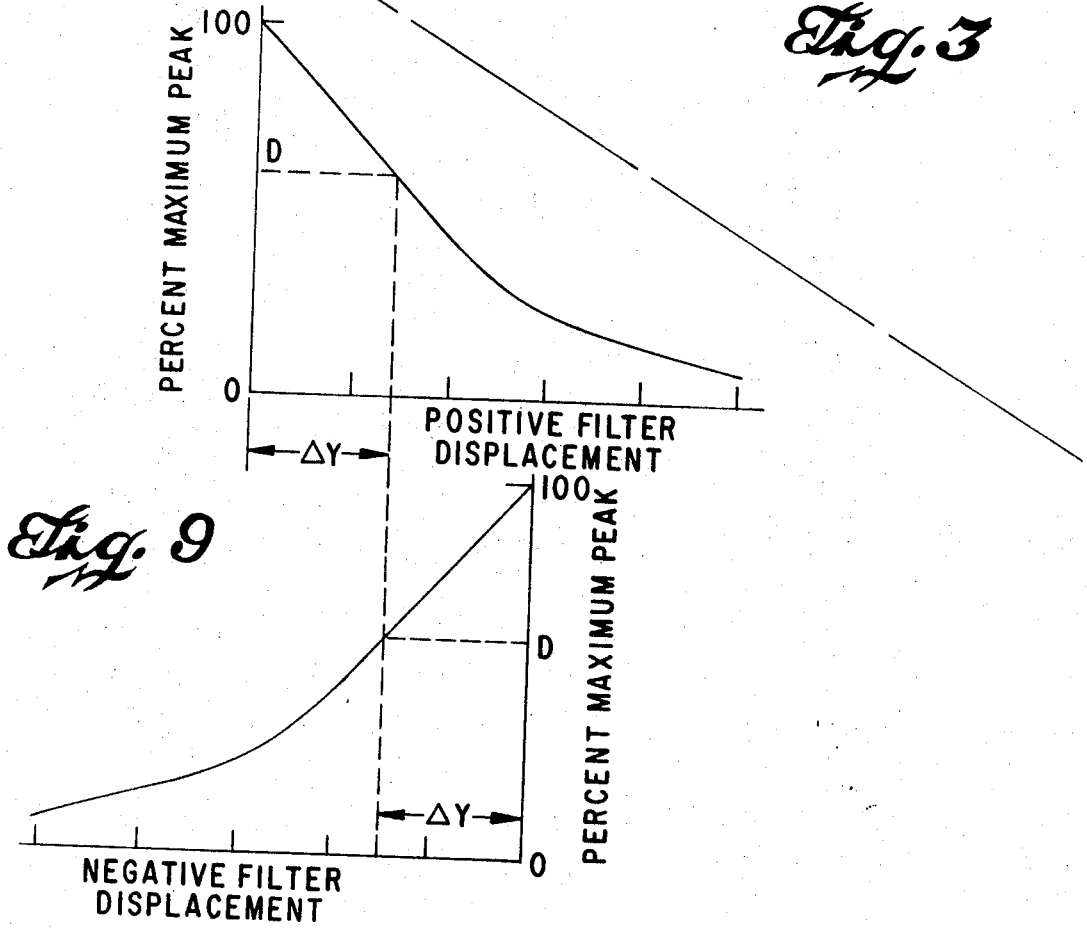
FIG. 9 is a graph illustrating light output for positive and negative deivation of the special filter.

FIG. 9 graphically shows the percentage of the maximum peak in light intensity due to a match between the filter and the reference elements, for positive and negative displacements along one axis of the filter. The up-down, or Y axis is chosen for illustration in the figure, but similar curves would apply for displacement in the left-right or X direction of displacement. As is seen from that figure, the light intensity in the output plane due to a match between the filter and the reference elements is never zero. The optimum or null position of the filter is that point at which the light intensity in the output plane due to the optical coupling between the upper reference exposure in the special filter (this exposure stage being completed in FIG. 6) and the upper reference element 29, adjacent the imagery, is exactly equal to the intensity in the output plane due to the optical coupling between the lower reference exposure in the special filter (this exposure step being completed in FIG. 5) and lower reference element 30. Thus, any displacement of the filter from this null or optimum position along the Y axis will cause the light intensity in the output plane to be greater or less (depending upon the direction of displacement) near light sensor 33 than the light intensity near sensor 34. There will accordingly be a difference in the voltage output of light sensors 33 and 34 when the filter is displaced in the Y direction. To exploit this difference and to generate an error signal for correcting the displacement, the outputs of light sensors 33 and 34 are connected to differential amplifier 37 which generates an error signal corresponding to the difference between the outputs of the light sensors. The output of the differential amplifier is then connected to electromechanical servo 38 which moves the filter holder (and filter therein) back into proper alignment according to the error signal generated by differential amplifier 37. Similarly, the outputs of light sensors 35 and 36 are connected to differential amplifier 39, so that differences in the outputs of these light sensors due to displacement of the filter in the X direction will create an error signal from the output of differential amplifier 39 corresponding to the difference in outputs of light sensors 35 and 36. The output of differential amplifier 39 is similarly connected to electromechanical servo 40, which drives the filter back into proper alignment along the X axis, in response to the error signal from differential amplifier 39.

This automatic filter alignment means herein described, though it has been described in connection with recognizing targets from the imagery, is also particularly applicable to any case where Fraunhofer holograms are used as spatial frequency filters.

It is to be understood that the method and apparatus of my invention, herewith shown and described, is to be taken as a preferred example of the same and that various changes in the steps to be performed, or the data to be operated on, may be resorted to without departing from the spirit and scope of the invention as defined by the appended claims.

What is claimed is:

1. An automatic filter alignment apparatus in an optical complex spatial filtering system, the combination comprising:

(a) a source of coherent light,
(b) an information transparency in an information plane in the path of said beam of light having positional reference patterns along at least one edge thereof,
(c) complex spatial filtering means for processing said information transparency including filters responsive to said reference patterns,
(d) optical means in optical relationship with said filtering means for imaging in the output focal plane of said optical means any unbalanced light pattern created when said complex spatial filtering means is misaligned relative to said reference patterns in said information plane, and
(e) means responsive to said unbalanced light pattern for realigning said filtering means.

2. The system of claim 1 wherein said means for realigning includes a first pair of light sensing means located behind said output plane and parallel to a first edge of said information transparency to detect said unbalanced light patterns and producing a first pair of electrical signals indicative of the change in intensity of said light patterns.

3. The system defined in claim 2 further including a first differential amplifier connected at its inputs to said first pair of electrical signals from said light sensing means for generating a first error signal proportional to the amount of misalignment of said filtering means along said first edge.

4. The system as defined in claim 3 further including first servo means electrically connected to said first differential amplifier for aligning said filtering means along said first edge.

5. The system of claim 4 further including a second pair of light sensing means behind said output plane and parallel to a second orthogonal edge of said information transparency to detect said unbalanced light patterns and producing a second pair of electrical signals indicative of the change in intensity of said light patterns.

6. The system as defined in claim 5 further including a second differential amplifier connected at its inputs to said second pair of electrical signals from said light sensing means for generating a second error signal proportional to the amount of misalignment of said filters along said second edge.

7. The system as defined in claim 6 further including second servo means electrically connected to said second differential amplifier for aligning said filtering means along said second edge.

8. An alignment technique in an optical spatial filtering system, the steps comprising:
inserting an information transparency in an information plane into a beam of coherent light thereby imparting information contained in said transparency to said beam, placing in the path of said beam a complex spatial filter sensitive to certain of the information contained in the transparency, focusing the light transmitted by said filter onto an output plane where a light spot indicative of the presence of the information contained in said transparency to which said filter is sensitive is imaged, sensing misalignment of said filter at the output plane to create an optical indication thereof by placing reference patterns along at least one edge of said information transparency and superimposing the spectrum of said reference patterns on said filter, detecting said optical indication and converting same into an error signal, and moving said filter into proper alignment in response to said error signal.

9. The method of claim 8 in which the step of detecting said optical indication is performed by placing light sensing means behind said output plane, generating output error signals from each of said light sensing means when said filter is misaligned, producng a difference signal from said error signals proportional to the amount of misalignment of said filter and generating an alignment signal responsive to said difference signal to realign said filter.

References Cited
UNITED STATES PATENTS

| 3,370,268 | 2/1968 | Dobrin et al. | 356—71 |
| 3,425,770 | 2/1969 | Mueller et al. | 356—71 |
| 3,435,244 | 3/1969 | Burckhardt et al. | 350—162 |

OTHER REFERENCES

A. Vander Lugt, The Effects of Small Displacements of Spatial Filters, Applied Optics, vol. 6, No. 7, July 1967, pp. 1221–1225.

RONALD L. WIBERT, Primary Examiner

J. ROTHENBERG, Assistant Examiner

U.S. Cl. X.R.

350—162; 356—172